United States Patent [19]

Klein et al.

[11] B 4,014,978
[45] Mar. 29, 1977

[54] AIR POLLUTION CONTROL SYSTEM AND METHOD

[75] Inventors: Herschel A. Klein, Windsor; Carl R. Bozzuto, Waterbury, both of Conn.

[73] Assignee: Combustion Engineering, Inc., Windsor, Conn.

[22] Filed: Aug. 24, 1970

[21] Appl. No.: 66,272

[44] Published under the second Trial Voluntary Protest Program on February 24, 1976 as document No. B 66,272.

[52] U.S. Cl. .............................................. 423/242
[51] Int. Cl.$^2$ ........................................ B01D 53/34
[58] Field of Search ...... 23/2; 66, 67, 122, 130–32; 423/242, 519

[56] References Cited

UNITED STATES PATENTS

| | | | |
|---|---|---|---|
| 2,042,477 | 6/1936 | Miller et al. | 23/132 |
| 2,080,779 | 5/1937 | Lessing | 23/2 |
| 2,090,143 | 8/1937 | Nonhebel et al. | 23/2 |
| 2,113,198 | 4/1938 | Nonhebel et al. | 23/2 |

OTHER PUBLICATIONS

Pearson, J. L., et al.; "A Dissertation on the Howden – I.C.I. Flue Gas Washing System," The Institute of Fuel; London; 1934; pp. 1, 12–16, 19–23.
Pascal, et al.; Nouveau Traite de Chimie Minerale, Vol. IV, pp. 416–417; Masson et Cie., Paris, 1958.

*Primary Examiner*—G. O. Peters
*Attorney, Agent, or Firm*—Richard H. Berneike

[57] ABSTRACT

A system and method are described in which sulfur-containing flue gases are contacted with a solution containing excess calcium or magnesium bicarbonate. The sulfur oxides are reacted with the bicarbonate producing soluble bisulfites. This solution is then oxidized for pH control to produce calcium or magnesium sulfate and sulfuric acid. Dolomite or limestone or similar additives are then introduced to precipitate sulfates and to regenerate the bicarbonate solution for recycle to the scrubber.

4 Claims, 1 Drawing Figure

U.S. Patent
Mar. 29, 1977
4,014,978
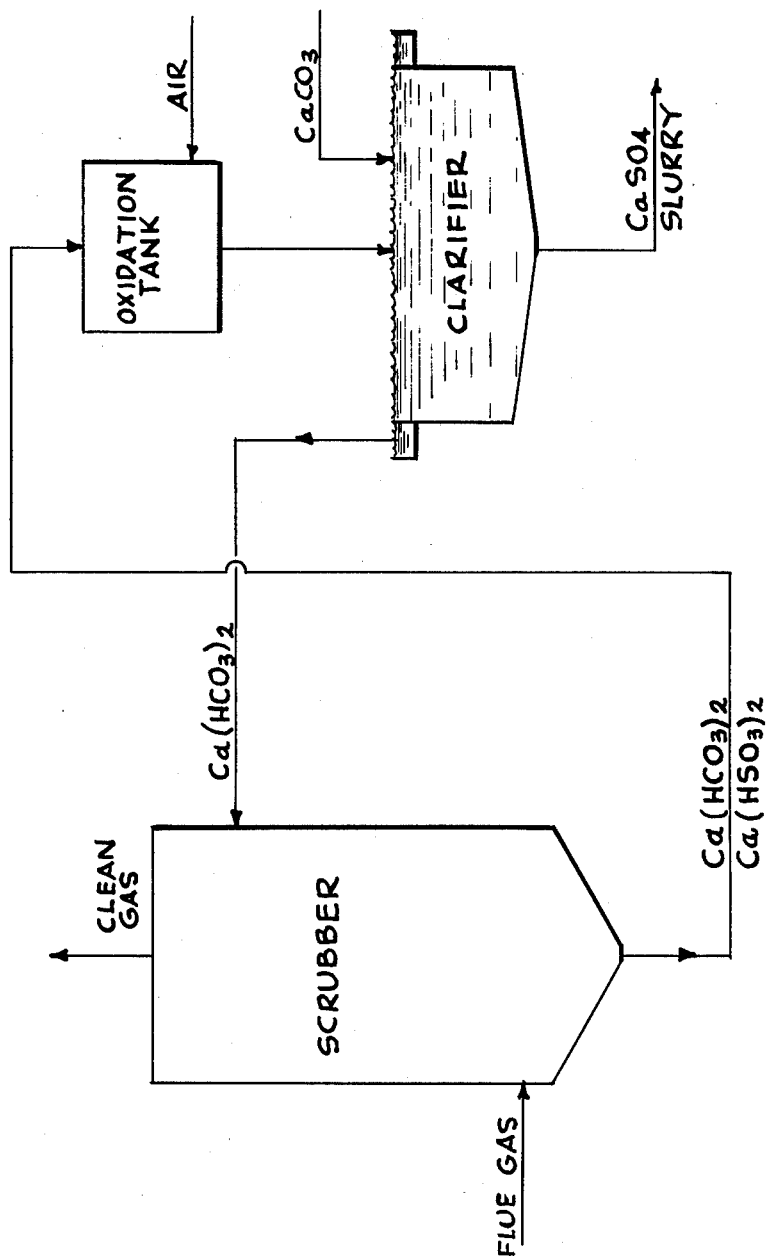
INVENTOR.
HERSCHEL A. KLEIN
CARL R. BOZZUTO
BY Richard H. Berneike
ATTORNEY

AIR POLLUTION CONTROL SYSTEM AND METHOD

BACKGROUND OF THE INVENTION

Air pollution has become a major problem in recent years and there is currently much time, effort and expense being put forth to devise economical schemes for reducing this pollution. One of the many sources of air pollution is the flue gases emitted from fuel-burning equipment such as steam generating units. The sulfur oxides, $SO_2$ and $SO_3$, are of major concern as air pollutants in such flue gases. The particulate matter such as fly ash and other dust particles also contribute to the pollution problem if not completely removed. Most of the schemes which have been developed to date to remove these obnoxious flue gas constituents have involved either or both high capital investment and high operating cost rendering the schemes impractical.

One approach to this air pollution control problem has been to remove $SO_2$ and $SO_3$ by reaction with carbonates primarily calcium and/or magnesium carbonate in the form of limestone or dolomite. These are cheap, readily available materials, but problems arise in effecting a complete reaction and removal of all the sulfur oxides. One such process is referred to as the dry limestone process and involves the addition of dry pulverized limestone directly to the furnace. The carbonate is calcined to the oxide form which reacts with the sulfur oxides. Although there is almost complete reaction of $SO_3$ with the additive, most of the sulfur is in the dioxide form and reaction of the sulfur dioxide might be only on the order of 50 percent or less. This is an unsatisfactory ultimate solution to the pollution problem.

Another approach is an extension of the above-described dry limestone process and incorporates a wet scrubber. This wet scrubber, in addition to removing particulate matter, acts as a reactor in which the calcium and/or magnesium oxides dissolve in the scrubber water and react in the liquid phase with the $SO_2$. Since there is a relatively short residence time of the gases and additive in the scrubber water, getting the additive dissolved and reacted can be a problem without very careful scrubber design. Also, pH control of the scrubber water can be difficult which can cause problems such as scaling and corrosion.

SUMMARY OF THE INVENTION

An object of the present invention is to provide an air pollution control system for fuel-burning processes. More specific objects and advantages are to provide a scrubber system which can readily be operated in a closely controlled pH range, which recirculates a scrubbing solution containing excess alkalinity, which utilizes an inexpensive source of alkali additive and which can readily be monitored and controlled.

These objects are accomplished by wet scrubbing the gases with a bicarbonate solution followed by air oxidation for pH control. By reaction with a carbonate additive, the bicarbonate scrubbing solution is regenerated and sulfates precipitated. The objects, advantages and details of the invention will be more apparent from the detailed description which follows.

BRIEF DESCRIPTION OF THE DRAWING

The drawing is a schematic flow diagram of the process of the present invention.

DESCRIPTION OF THE PREFERRED EMBODIMENTS

Flue gases from a combustion process such as a fossil fuel burning furnace containing sulfur oxides are fed to the scrubber. The sulfur oxides may be in the form of $SO_2$ and $SO_3$ but they will normally be mostly in the dioxide form. The $SO_3$ can readily be reacted with additives introduced into the furnace itself thus preventing $SO_3$ corrosion in the furnace and on low temperature heat exchange surfaces. This can be accomplished by adding only that quantity of alkali such as dolomite or limestone to the furnace required to react with the $SO_3$. This step, however, is not necessary to the present invention but is only an adjunct thereto.

The flue gases are contacted, preferably in a counter-current manner, in the scrubber with an aqueous solution of a bicarbonate selected from the alkaline earth metal bicarbonates. The two materials of practical interest are $Ca(HCO_3)_2$ and $Mg(HCO_3)_2$. The calcium compounds will be referred to hereinafter for illustrative purposes but it will be understood that the magnesium compounds or mixtures of calcium and magnesium compounds as well as other alkaline earth metal compounds are included within the scope of the invention. The reaction which takes place with the calcium bicarbonate scrubbing solution is as follows:

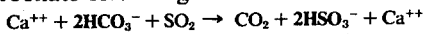
$$Ca^{++} + 2HCO_3^- + SO_2 \rightarrow CO_2 + 2HSO_3^- + Ca^{++}$$

The bicarbonates are soluble and the concentration in the scrubbing solution is high, on the order of 0.1 molar, so that there will always be an excess after reaction with the sulfur oxides. This highly buffered solution permits pH control of the scrubbing solution in the range of 6.0 – 4.5. In this pH range, corrosion is not significant. Also, the carbonate and sulfite ion concentrations are negligible which means that there is no precipitation and scaling problem. The concentration of dissolved $SO_2$ in the liquid is sufficiently low such that the absorption process is effective and only bisulfite ions exist. Oxidation of the bisulfite to sulfate in the scrubber is low due to the short residence time and the low residual oxygen concentration.

The solution from the scrubber containing primarily $Ca(HSO_3)_2$ and excess $Ca(HCO_3)_2$ is transferred to an oxidation tank or reactor. Air is contacted with the solution for pH control and the following reaction takes place:

$$Ca^{++} + 2HSO_3^- + O_2 \rightarrow CaSO_4 + 2H^+ + SO_4^=$$

This step allows for the removal of bisulfites as well as any sulfites from the system. As a result, sulfite scaling can be eliminated and a greater driving force for $SO_2$ absorption can be maintained in subsequent steps. The production of sulfuric acid in this oxidation step lowers the pH to a range of about 1.5 – 4.0.

The oxidized flow stream from the oxidation tank or reactor is next fed to the clarifier. Alkaline earth metal carbonate additive is also added to the clarifier along with the main flow stream. As a practical matter, this additive would be either $CaCO_3$ or $MgCO_3$ in the form of pulverized limestone or dolomite. Since the pH is now so low, the carbonate additive will readily go into solution by reaction with the sulfuric acid according to the following reaction:

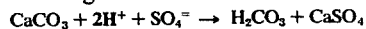
$$CaCO_3 + 2H^+ + SO_4^= \rightarrow H_2CO_3 + CaSO_4$$

The carbonic acid which is formed in the above reaction also reacts with the carbonate additive in the following bicarbonate regeneration reaction:

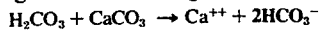
$$H_2CO_3 + CaCO_3 \rightarrow Ca^{++} + 2HCO_3^-$$

The resulting solution withdrawn from the clarifier has a pH of 4.0 – 6.0 and is recycled to the scrubber at a rate sufficient to maintain an excess of bicarbonate. The precipitated calcium sulfate along with fly ash and other particulate matter from the flue gases are removed from the clarifier and disposed of. Of course, as many clarification steps may be used as are necessary and the oxidation reaction may be carried out in a clarifier rather than in a separate oxidation tank or reactor. Also, the $CaCO_3$ may be added to the oxidation tank or reactor rather than the clarifier or a separate reaction vessel may be provided for this purpose.

While the invention has been shown and described with reference to preferred embodiments, it will be understood that this is merely illustrative and that changes may be made in the process without departing from the scope of the invention as claimed.

We claim:

1. A method of removing sulfur dioxide from the flue gas produced by the combustion of sulfur-containing fuels comprising the steps of:
   a. contacting said flue gas in a scrubbing zone with an aqueous scrubbing stream containing an alkaline earth metal bicarbonate in solution, the amount of said alkaline earth metal bicarbonate in solution being in excess of the amount required to completely react with said sulfur dioxide in said flue gas whereby said sulfur oxides react with said bicarbonate to produce alkaline earth metal bisulfite in solution and whereby the pH of said aqueous scrubbing stream during said contact is maintained between 6.0 and 4.5,
   b. withdrawing said aqueous scrubbing solution from said scrubbing zone,
   c. contacting said aqueous scrubbing stream containing said bisulfite in solution with an oxygen-containing gas stream whereby said bisulfite is oxidized to form alkaline earth metal sulfate precipitate and sulfuric acid in solution,
   d. introducing alkaline earth metal carbonate into said aqueous scrubbing stream whereby said carbonate reacts with said sulfuric acid to form additional alkaline earth metal sulfate precipitate and said excess alkaline earth metal bicarbonate in solution,
   e. separating said alkaline earth metal sulfate precipitate from said aqueous scrubbing stream, and
   f. recycling said aqueous scrubbing stream containing said excess alkaline earth metal bicarbonate to step (a).

2. A method as recited in claim 1 wherein said alkaline earth metal is calcium.

3. A method as recited in claim 1 wherein said alkaline earth metal is magnesium.

4. A method as recited in claim 1 wherein said alkaline earth metal comprises both calcium and magnesium.

* * * * *